F. RAYMOND & A. MILLER.
GRAIN BIN.
No. 98,190.
Patented Dec. 21, 1869.
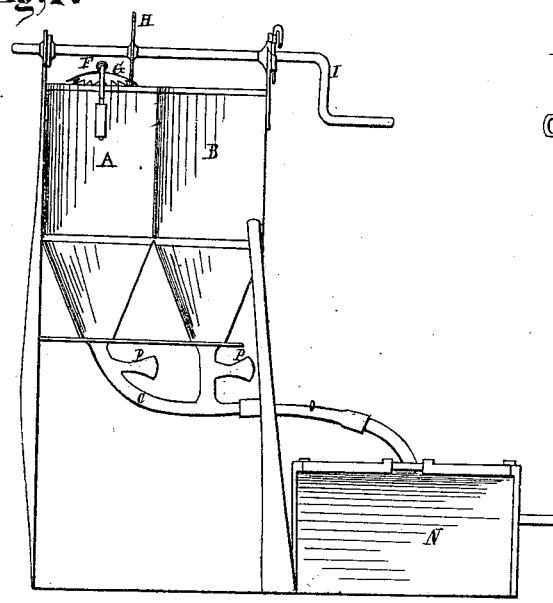
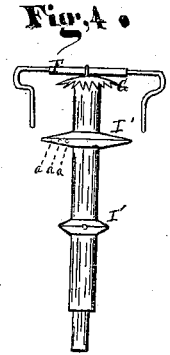
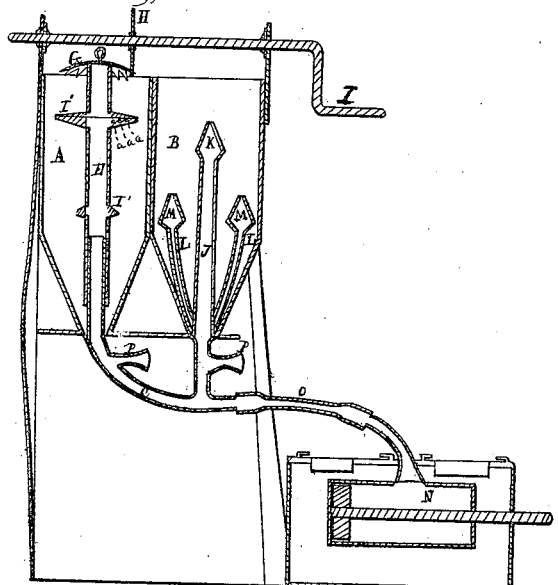
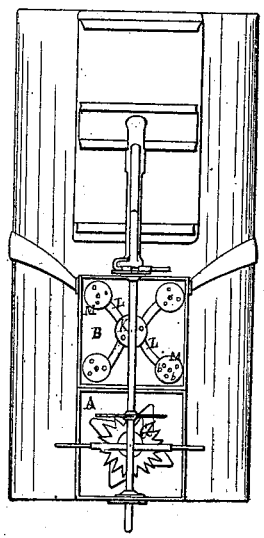

United States Patent Office.

FITCH RAYMOND AND AUGUST MILLER, OF CLEVELAND, OHIO.

Letters Patent No. 98,190, dated December 21, 1869.

IMPROVEMENT IN GRAIN-BINS.

The Schedule referred to in these Letters Patent and making part of the same

*To all whom it may concern:*

Be it known that we, FITCH RAYMOND and AUGUST MILLER, of Cleveland, in the county of Cuyahoga, and State of Ohio, have invented certain new and useful Improvements in Grain-Bins; and we do hereby declare that the following is a full and complete description of the same, reference being had to the accompanying drawings, making part of this specification, in which—

Figure 1 represents a side view of the bin.

Figure 2, a vertical transverse section.

Figure 3, a view of the top.

Figure 4, a detached section.

Like letters of reference refer to like parts in the different views.

This invention has for its object the airing or ventilating of grain, when stored in bins, by injecting therein a current of air produced by a fan-blower or pump, and agitating, or not, the grain while thus being ventilated, thereby keeping the same cool and dry, so that it cannot become heated, mouldy, nor damp while in store, as hereinafter more fully described.

It is well known to those dealing in grain, that when large quantities are stored together, as in bins constructed for that purpose, in consequence of the water it contains, it becomes heated, and as a consequence, mouldy, unless frequently changed, or so agitated as to allow the heated air and sweat to escape. To do this, it is sometimes changed from one bin to another, or otherwise moved about, so that it may become aired or ventilated by exposure to the air.

This, in large masses of grain, is not only a matter of much labor and expense, but is often impracticable for the want of room. Hence frequent losses result from injury to the grain by its becoming heated and mouldy.

To save said labor and expense, and to prevent loss by the heating and moulding of the grain, is the purpose of this invention, and which is constructed and operated as follows:

In fig. 1, A B represent two grain-bins, which, however, may be of any number, shape, and holding-capacity.

The lower ends of said bins are funnel-shaped, and into the throat thereof is inserted one end of an air-pipe, C, or branches of the same, as shown in the bin B, which will be hereinafter referred to.

The end of said pipe forms a standard, over which is closely but not tightly fitted the lower end of a hollow vertical shaft, E, fig. 4.

Said shaft is supported at the upper end by a cross-beam, F, fig. 3, in which it is journaled, and made to revolve, by a crown-wheel, G, actuated by a corresponding gear, H, to which motion is given by the crank I.

The vertical shaft referred to is provided with a more or less number of radial arms, I', which are also hollow, and communicate directly with the interior of the shaft.

Along one side of each arm is a series of vents or holes, *a*. Said arms are so constructed that a part of the upper side is made to project slightly over the vents or holes, forming a narrow, cornice-like projection, whereby the holes are protected from the grain, as will presently be shown.

In the bin B, a branch of the pipe C is projected, forming a central upright rigid tube, J, the top of which is crowned with a rose, K, perforated with a number of fine holes, *b*.

Branching upward from the base of said tube is a number of supplementary tubes, L, the sides of which, in like manner, are perforated, and with a perforated rose, M.

The pipe C, to which the pipes L, and J, &c., are attached, is connected to an air-pump, N, fig. 2, by means of a flexible tube, O, or said pipe may be attached to a blower, or other device for producing a current of air.

The practical operation of the above-described apparatus is as follows:

The grain for storage is thrown into the bins A B. Now, from time to time, as the condition of the grain may require, a current of air is impelled into the vertical shaft, by means of the pump or blower, which escapes therefrom through the air-holes *e* in the side thereof, and also from the vents or holes seen in the sides of the radial arms, constituting an agitator, which, at the same time, is made to revolve, and thereby stirs up the grain and exposing it to the inducted draught of air from the shaft and radial arms. By this means, the excessive heat and moisture generated by the mass of grain are driven off and replaced by cool, dry air, which effectually preserves the grain from moulding and consequent loss.

It will be obvious, that by this device, the time, labor, and expense of agitating the grain, by drawing it from one bin to another, or by disturbing it by hand, as is sometimes practised, are avoided, and the grain more completely ventilated and cooled, and therefore in a better condition for the manufacturer. Should the condition of the grain be such as not to require agitation, but simply airing, it is effected by the branching tubes shown in bin B. These several tubes being buried in the grain, a current of air is impelled into it from the sides of the tubes and perforated roses terminating there, and thus the mass of grain may be fully ventilated, and the moisture and heat carried off, leaving the grain cool and dry.

This apparatus is equally applicable to the ventilation of the holds of vessels, or other close places where the air is liable to become foul from inaction and dampness.

It is also applicable to the ventilation and cooling of the mash in the tubs of breweries and distilleries, so that the temperature of the fermenting mash can be regulated, thereby preventing it from spoiling from excess of heat, which it is liable to do in hot or warm weather.

The amount of air impelled into the grain, or other places, is regulated by stop-cocks P, so that a large or small volume of air can be used, as the circumstances may requrie.

The purpose of the cornice-like projection immediately over the vents or holes in the radial arms, is to prevent the grain above from falling down upon and pressing too much against the vents, thereby obstructing the escape of the air from the shaft and arms, which, as they may revolve, will leave an unoccupied space immediately under the projection, which will facilitate the escape of the current of air into the grain or mash.

What we claim as our improvement, and desire to secure by Letters Patent, is—

1. A grain-bin or a series of bins, constructed with a revolving perforated hollow shaft, E, radial arms I', and air-vents a, all arranged and combined to operate in combination with an air-pump or blower, in the manner substantially as described, and for the purpose specified.

2. A grain-bin or bins, constructed with branching perforated distributing-tubes, J L L, when provided with rose-heads M M K, and arranged, in relation to and in combination with an air-pump or blower, in the manner substantially as described, and for the purpose set forth.

FITCH RAYMOND.
AUGUST MILLER.

Witnesses:
W. H. BURRIDGE,
J. H. BURRIDGE.